(12) United States Patent
Schmidt et al.

(10) Patent No.: US 7,756,954 B2
(45) Date of Patent: *Jul. 13, 2010

(54) METHOD FOR HETEROGENEOUS SYSTEM CONFIGURATION

(75) Inventors: David Schmidt, Round Rock, TX (US); Herbert A. Hollinger, Pflugerville, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/206,794

(22) Filed: Sep. 9, 2008

(65) Prior Publication Data

US 2009/0006588 A1    Jan. 1, 2009

Related U.S. Application Data

(63) Continuation of application No. 10/829,728, filed on Apr. 21, 2004, now Pat. No. 7,430,592.

(51) Int. Cl.
*G06F 15/177* (2006.01)

(52) U.S. Cl. ............................ 709/220; 710/8; 710/9; 713/1

(58) Field of Classification Search ............ 709/220; 710/8, 9; 713/1
See application file for complete search history.

(56) References Cited

U.S. PATENT DOCUMENTS

| | | | |
|---|---|---|---|
| 5,787,491 A | 7/1998 | Merkin et al. | |
| 5,825,651 A | 10/1998 | Gupta et al. | |
| 5,850,397 A | 12/1998 | Raab et al. | |
| 6,078,979 A | 6/2000 | Li et al. | |
| 6,240,511 B1 | 5/2001 | Blumenau et al. | |
| 6,286,066 B1 | 9/2001 | Hayes et al. | |
| 6,421,671 B1 | 7/2002 | Bryan et al. | |
| 6,446,141 B1 | 9/2002 | Nolan et al. | |
| 6,538,669 B1 | 3/2003 | Lagueux, Jr. et al. | |
| 6,639,900 B1 | 10/2003 | Anstey et al. | |
| 6,721,883 B1 | 4/2004 | Khatri et al. | |
| 6,754,817 B2 | 6/2004 | Khatri et al. | |

(Continued)

FOREIGN PATENT DOCUMENTS

EP    1 150 192    4/2000

(Continued)

OTHER PUBLICATIONS

Search Report for Application No. GB0818191.9, Oct. 30, 2008, 2 pgs.

(Continued)

*Primary Examiner*—Yves Dalencourt
*Assistant Examiner*—Michael C Lai
(74) *Attorney, Agent, or Firm*—Hamilton & Terrile, LLP; Stephen A. Terrile

(57) ABSTRACT

A method for provisioning systems within a solution which includes mapping a physical identifier of a component within a system to a logical identifier of the component within a system and mapping the logical identifier of the component within a system to an implementation identifier of the component within the system. The mapping conforms to a predetermined user identifiable naming convention.

5 Claims, 6 Drawing Sheets

U.S. PATENT DOCUMENTS

| | | | |
|---|---|---|---|
| 6,772,099 | B2 | 8/2004 | Merkin et al. |
| 2002/0156951 | A1 | 10/2002 | Beeston et al. |
| 2002/0188643 | A1 | 12/2002 | Kennedy |
| 2002/0188701 | A1* | 12/2002 | Brown et al. ............... 709/220 |
| 2003/0204791 | A1 | 10/2003 | Helgren et al. |
| 2003/0225924 | A1* | 12/2003 | Jung et al. ............... 709/313 |
| 2004/0088294 | A1* | 5/2004 | Lerhaupt ............... 707/8 |
| 2008/0181134 | A1 | 7/2008 | Anerousis et al. |

FOREIGN PATENT DOCUMENTS

| | | |
|---|---|---|
| FR | 2 778 252 | 1/1999 |
| GB | 2 301 206 | 11/1996 |
| GB | 2 406 466 | 3/2005 |
| WO | WO 01/87615 A2 | 11/2001 |
| WO | WO 2008016861 | 2/2008 |

OTHER PUBLICATIONS

Examination Report for Application No. GB0506551.1, Sep. 26, 2008, 6 pgs.

Response to Office Action for Application No. GB0506551.1, Oct. 29, 2008, 8 pgs.

Response to Office Action for Application No. PI20051675, Sep. 18, 2008, 25 pgs.

* cited by examiner

METHOD FOR HETEROGENEOUS SYSTEM CONFIGURATION

This application is a continuation of application Ser. No. 10/829,728, filed Apr. 21, 2004, now U.S. Pat. No. 7,430,592, issued Sep. 30, 2008, entitled Method for Heterogeneous System Configuration, naming David Schmidt, Herbert A. Hollinger, and Mukund P. Khatri as inventors, which is hereby incorporated by reference in its entirety.

BACKGROUND OF THE INVENTION

1. Field of the Invention

The present invention relates to the field of information handling systems, more particularly to deploying information handling systems in a multi-server environment 2. Description of the Related Art As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems (including server systems), data storage systems, and networking systems.

One issue relating to computer systems relates to deploying computer systems in a multi-system environment. A multi-system deployment includes three phases, a deployment planning phase 110, a deployment operation phase 120 and a deployment transition phase 130 (See for example, FIG. 1, labeled Prior Art). The deployment planning phase 110 includes setting up an initial solution configuration based on capabilities of hardware, as well as developing and integrating automated delivery processes. The deployment operation phase 120 includes delivering a solution configuration to each server. The deployment transition phase 130 includes migrating existing solution configurations to new platforms as old platforms reach end-of-life or next generation systems become available as well as developing and integrating new automated delivery processes.

Known deployment methods often may carry a high fixed cost for each deployment phase and a high variable cost as the number of systems being deployed increases. Additionally, the cost of deployment continues to rise as systems become more heterogeneous within an environment, since automated delivery processes become more complex. Differences between server models also increase the risk of deployment errors and system misconfigurations.

Systems in a deployment set can vary from exactly identical to completely different. The amount of difference between each system determines how and when device configurations must be assigned (or "bound") to system devices. Homogeneous deployments can use solutions that require early binding between the configuration and the systems (e.g., configuration data for a redundant array of independent disks (RAID) card should be determined during the planning phase.) Heterogeneous deployments can use deployment solutions that require late binding of configurations to devices. An example of late binding would be determining the configuration data for a RAID card on a per-system basis during the operation phase.

It is desirable to provide a method to deploy solution configurations to multiple heterogeneous systems in a simple, automated manner. A desirable solution would carry low fixed costs across each phase of the deployment process, and little or no variable costs as the number of systems increases.

There are a plurality of known methods of deploying multiple systems. These known methods can be classified into three categories, an automated deployment of same systems category (i.e., a homogeneous category), an automated deployment of implementation equivalents category (i.e., homogeneous with slight exceptions category), and a manual deployment of capability equivalents category (i.e., a heterogeneous category). Each of the categories provides associated advantages and disadvantages during the deployment lifecycle.

The automated deployment of same systems category deploys a solution configuration across homogeneous systems where servers are exactly alike (i.e., the same model, peripherals, peripherals located in same physical slots, chipsets and storage components). The deployment of same systems enables early binding of configurations to systems. With the automated deployment of same systems category, known automation processes and software can be used to reduce some variable costs. For example, an image from a source system may be captured and then this image may be deployed to multiple servers. However, with the automated deployment of same systems category, the initial system configuration should be developed (i.e., a source image should be created) and system particulars should be learned prior to deployment. Early binding requires that the configuration of system devices be fully expressed during the planning phase. Additionally, during the operation deployment phase early binding may cause any variance between systems to break the automated deployment process or corrupt the system configuration. Additionally, during the transition deployment phase development of a new system configuration (i.e., a new source image) is required when new systems are added.

The automated deployment of implementation equivalents category deploys systems with identical implementations where models are trivially different, peripherals are identical, chipsets are trivially different, and storage configurations are trivially different. The deployment of implementation equivalents requires early binding with exception handling during the deployment process. With the automated deployment of implementation equivalents category, automated processes and software can be used to reduce some variable costs. However, with the automated deployment of implementation equivalents category, development is required for the system configurations and the automated process. Early binding requires that the configurations be completely defined, as well as any exceptions between the systems. The process must be tested to make sure that the process accurately handles each exception. During the transition deployment phase new models would require that a new automated process be created. The costs associated with the planning and operation phases are duplicated during a transition. All new systems can only be trivially different from each other.

The manual deployment of capability equivalents category provides human transformation of a solution's configuration across heterogeneous systems. In a manual deployment of capability equivalents category, systems can vary by model, peripherals, peripheral's slot location and storage components, but the capabilities of each system should be exactly alike. This is a late binding of configurations to systems. With a manual deployment of capability equivalents category no automation development is required and system component vendors can vary. Configurations can be manually adapted to fit each system. Because of late binding, configurations can be defined during the operation phase. During the transition phase configurations can be manually ported to new systems without additional development. New systems can be completely different from each other, provided they each have a baseline for capabilities. Late binding can be used when defining configurations for each system. However, with the manual deployment of capability equivalents category, there can be a high cost associated with the planning, operation, and transition phases of deployment. The high cost is associated with the human, manual deployment of each individual system. System differences must be accounted for during each phase of the deployment process. The risk of error during every phase is high due to the human interaction involved.

SUMMARY OF THE INVENTION

In accordance with the present invention, a method for providing an automated transformation of a configuration of a solution across heterogeneous systems is set forth. The systems can vary by model, peripherals, peripheral slot location and storage components, but have substantially identical functional capabilities.

In one embodiment, the invention relates to a method for provisioning systems within a solution which includes mapping a physical identifier of a component within a system to a logical identifier of the component within a system and mapping the logical identifier of the component within a system to an implementation identifier of the component within the system. The mapping conforms to a predetermined user identifiable naming convention.

In another embodiment, the invention relates to a method for configuring a plurality of systems within a solution which includes mapping physical identifiers of components within a compare system to respective logical identifiers of the components within the compare system, comparing the logical identifiers of a base system configuration with logical identifiers of the compare system configuration, translating the logical identifiers of the compare system to interface identifiers when the logical identifiers of the compare system configuration match the logical identifiers of the base system configuration and determining how to map the logical identifiers of the compare system to the logical identifiers of the base system when the logical identifiers of the compare system configuration do not match the logical identifiers of the base system configuration. The mapping conforms to a predetermined user identifiable naming convention. The mapping provides a compare system configuration. The compare determines whether logical identifiers of the compare system configuration match the logical identifiers of the base system configuration.

In another embodiment, the invention relates to an apparatus for provisioning systems within a solution which includes means for mapping a physical identifier of a component within a system to a logical identifier of the component within a system and means for mapping the logical identifier of the component within a system to an implementation identifier of the component within the system. The mapping conforms to a predetermined user identifiable naming convention.

In another embodiment, the invention relates to an apparatus for configuring a plurality of systems within a solution which includes means for mapping physical identifiers of components within a compare system to respective logical identifiers of the components within the compare system, means for comparing the logical identifiers of a base system configuration with logical identifiers of the compare system configuration, means for translating the logical identifiers of the compare system to interface identifiers when the logical identifiers of the compare system configuration match the logical identifiers of the base system configuration, and means for determining how to map the logical identifiers of the compare system to the logical identifiers of the base system when the logical identifiers of the compare system configuration do not match the logical identifiers of the base system configuration. The mapping conforms to a predetermined user identifiable naming convention. The mapping provides a compare system configuration. The compare determines whether logical identifiers of the compare system configuration match the logical identifiers of the base system configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The process for automated deployment of capability equivalents provides an automated transformation of a solution's configuration across heterogeneous systems. Systems can vary by model, peripherals, peripheral slot location and storage components, but the capabilities of each system are substantially identical. The process for automated deployment of capability equivalents provides an automated, late binding of configurations to systems with zero exceptions required to account for system differences.

Such a process provides a plurality of advantages. More specifically, with the process for automated deployment of capability equivalents, one system configuration can be developed for an entire deployment set. Accordingly, initial development time is extremely low. During the deployment operation phase, delivery of the configuration is automated. Any difference between systems is addressed via automation software. Such a method keeps risk of deployment errors low. Per-system variable cost is also low due to the automated process. During the deployment transition phase, the deployment configuration from the original deployment set can be used for the new deployment set. Adjustments can be made to the base configuration to account for new capabilities.

To apply a base configuration to many heterogeneous systems, the method provides a logical device naming scheme that allows devices to be referenced by type and location. The naming scheme resolves a device and location string to actual devices based on fixed resolution rules. With this scheme, a hardware/software configuration is generically created and replicated across heterogeneous servers, regardless of specific hardware device models, chipsets, storage configurations, and software configurations.

The process enables full provisioning of boot order, BIOS setup, I/O devices, storage devices, and driver configuration in an automated manner. The process also enables an actual configuration to be unknown for each target system (the software applies the rules of the naming scheme to match devices to configurations). The process also enables a deployment with a low amount of human interaction. When developing new systems, the existing configurations can be easily ported to new systems. Additionally, a customer's provisioning process remains unchanged when new servers are purchased. When sustaining systems, new devices or configurations may be introduced to existing servers without changing deployment process. When manufacturing systems, system slots can be populated differently from system to system without causing faulty factory tests.

Figure 1:
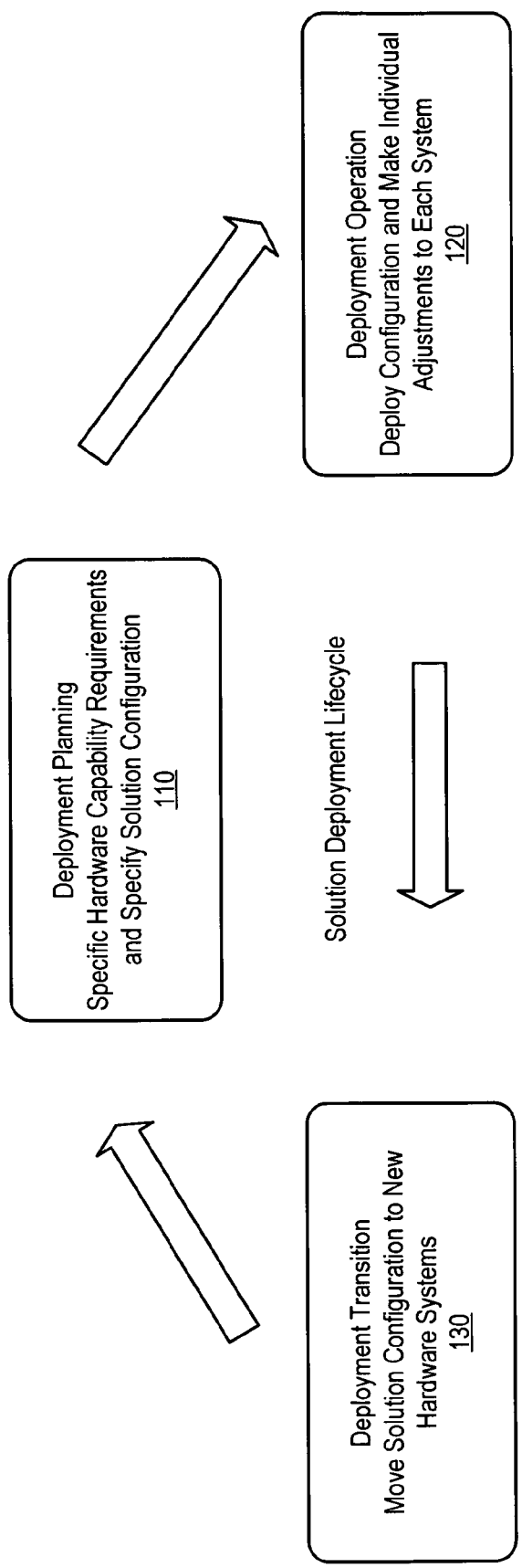
FIG. 1, labeled prior art, shows a block diagram of the deployment phases of a multi-server deployment.
Figure 2:
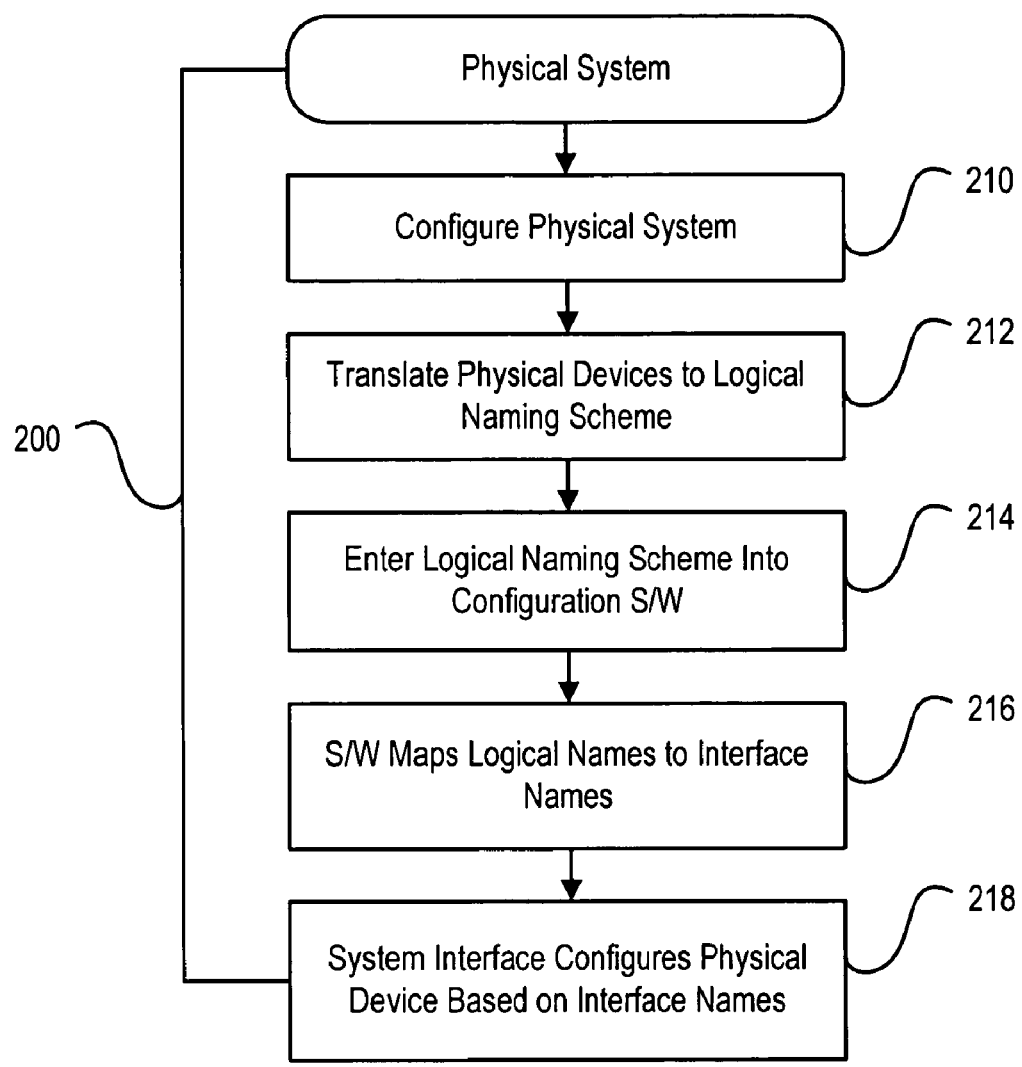
FIG. 2 shows a flow chart of a process for automated deployment of capability equivalents.

Referring to FIG. 2, a flow chart showing the operation of the process for automated deployment 200 is shown. More specifically, when performing the process for automated deployment on a physical system (i.e., the actual computer system), a physical system is configured at step 210. The configuring of the physical system might include configuring bios settings, including the boot order of the system. When configuring the physical system, a utility that updates the boot order might be used. The BIOS processes this change and sets the new boot order for the system.

Next, at step 212, when performing the translating, physical identifiers are mapped to corresponding logical identifiers based upon a predetermined user identifiable naming convention. The physical identifier represents an actual position of a device within a system, e.g., slot 1 or embedded slot 2. The logical identifier represents the location of a device in software deployment applications, e.g., PCI Slot 1.

Next, at step 214, user enters the logical identifiers are entered into configuration software of the system. A software utility, e.g., the provisioning software, then maps the logical identifiers to interface names, e.g., system device names, at step 216. An interface name (i.e., an implementation identifier) is the representation of a device used by a system, e.g., bus:device:function for a PCI bus. Then, the system interfaces configure the physical devices based upon the interface names at step 218.

Figure 3:
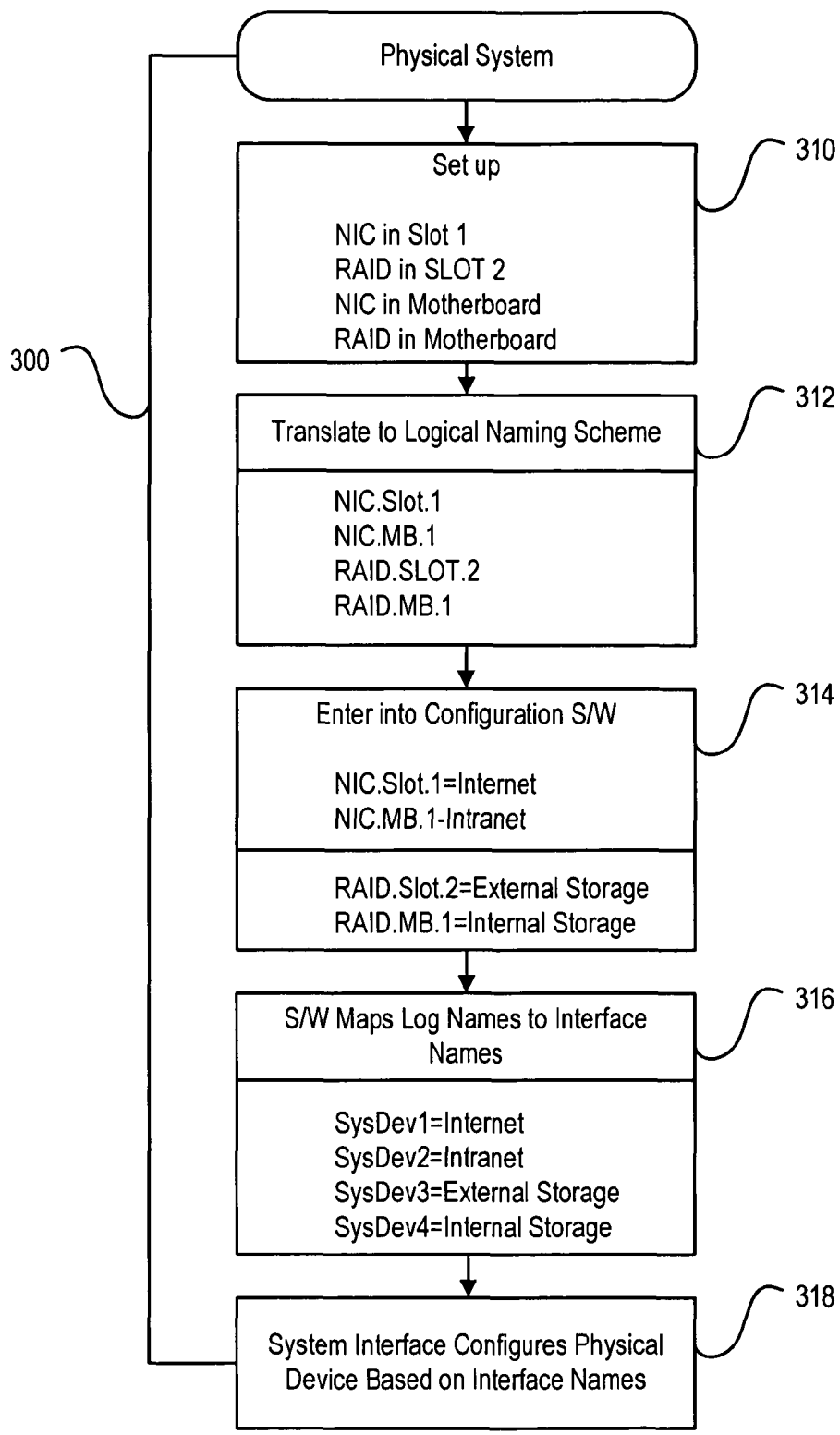
FIG. 3 shows a flow chart of an example of the process for automated deployment.

FIG. 3 shows an example of the process for automated deployment. More specifically, when configuring the physical system, the physical configuration on the system is observed at step 310. This physical configuration might include for example, one NIC card in PCI slot 1, one RAID card in PCI slot 2, an embedded NIC and an embedded RAID card. Next, the physical device identifiers are translated to logical device identifiers at step 312 using the predetermined user identifiable naming convention. In this example, the logical identifiers which correspond to the physical system are:
   a. nic.slot.1
   b. nic.mb.1
   c. RAID.slot.2
   d. RAID.mb.1

Next, at step 314, user enters the logical identifiers are entered into configuration software of the system. In this example, the logical identifiers that are entered into the configuration software set forth:
   a. nic.slot.1=internet
   b. nic.mb.1=intranet
   c. RAID.slot.2=external storage
   d. RAID.mb.1=internal storage The logical identifiers are then mapped to interface names, e.g., system device names, at step 316 via, e.g., a utility. In this example, the interface names might be:
   a. SYSDEV1=internet
   b. SYSDEV2=intranet
   c. SYSDEV3=external storage
   d. SYSDEV4=internal storage Then, the system interfaces configure the physical devices based upon the interface names at step 318.

Figure 4:
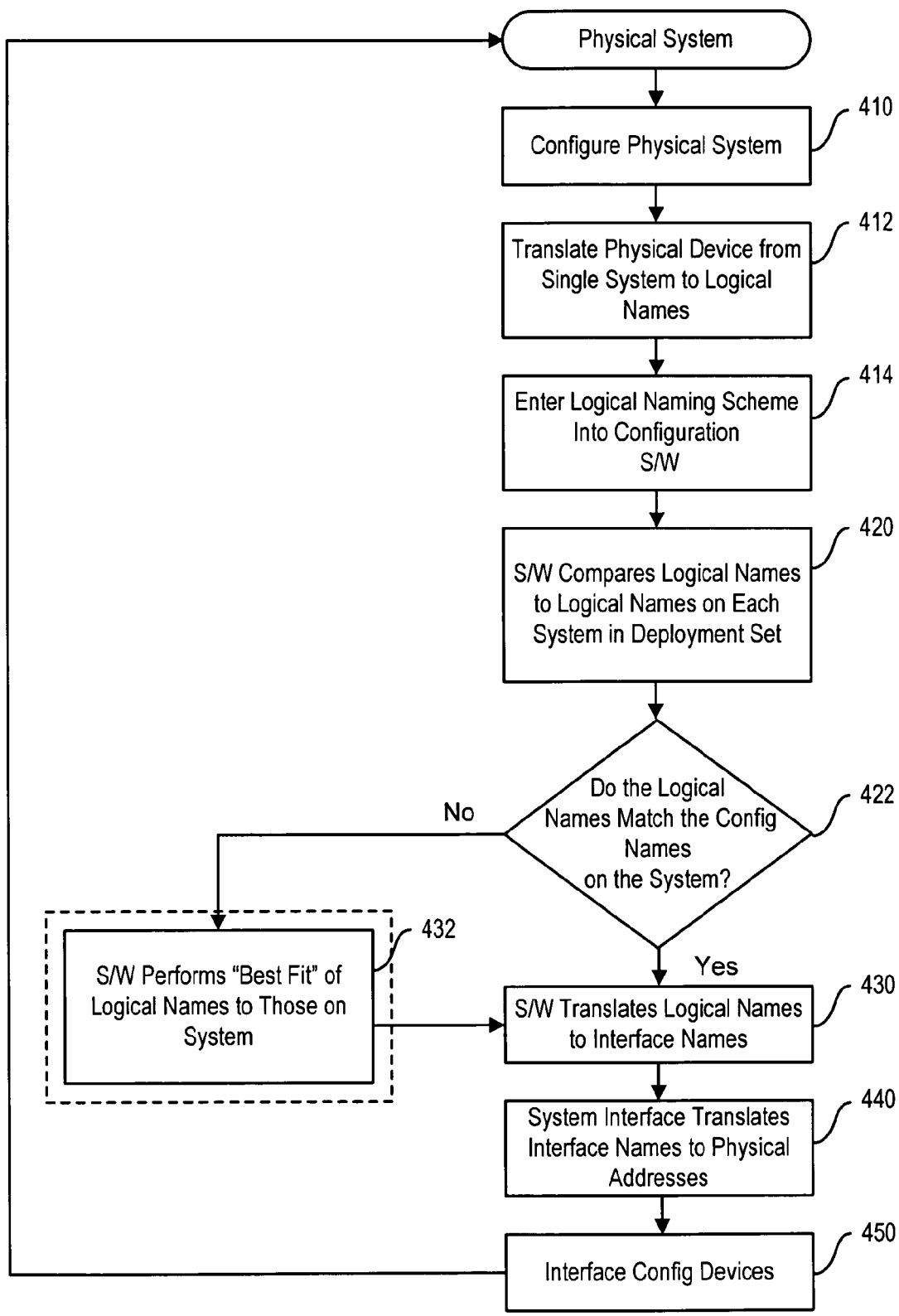
FIG. 4 shows a flow chart of the process for automated deployment across multiple systems.

Referring to FIG. 4, a flow chart of the process for automated deployment is shown. More specifically, when performing the process for automated deployment on a physical system (i.e., the actual computer system), a physical system is configured at step 410.

Next, at step 412, when performing the translating, physical identifiers are mapped to corresponding logical identifiers based upon the predetermined user identifiable naming convention. The physical identifier represents an actual position of a device within a system. The logical identifier represents the location of a device in software deployment applications. Next, at step 414, the logical identifiers are entered into provisioning software of the system.

The provisioning software then compares logical names of the physical systems to logical names on each system within a deployment set at step 420. The software then determines whether the logical names of each system match the logical names of a base system at step 422. Table 1 and Table 2 show examples of the compare and results from example logical name match determinations.

TABLE 1

| Base system devices | Compare system devices | Match? |
| --- | --- | --- |
| nic.slot.2 | nic.slot.1 | Yes, different physical location but same capabilities |
| nic.emb.1 | nic.emb.1 | Yes |
| nic.emb.2 | nic.emb.2 | Yes |
| raid.slot.1 | raid.emb.1 | Yes, different physical location but same capabilities |

TABLE 2

| Base system devices | Compare system devices | Match? |
| --- | --- | --- |
| scsi.emb.1 | scsi.slot.1 | Yes, different physical location but same device |
| scsi.emb.2 | scsi.slot.2 | Yes, different physical location but same device |
| raid.slot.1 | raid.emb.1 | Yes, different physical location but same device |
| nic.emb.1 | nic.emb.1 | Yes |
| nic.emb.2 | nic.slot.3 | Yes, different physical location but same device |

If the logical names do match, then the process translates the logical identifiers to interface names at step 430. If the logical names do not match, then the process performs a best fit analysis of the logical names of the system that does not match to the logical names on a base system at step 432. The best fit analysis then sets forth how to map the logical identifiers to interface names when discrepancies are identified by the best fit analysis. E.g., the best fit analysis might map one nic slot location to another nic slot location based upon predefined remapping information. After the best fit analysis is performed, then the process translates the logical identifiers to interface names as set forth by the best fit analysis at step 430.

Then, the system interfaces configure the physical devices based upon the interface names at step 440. I.e., the system interfaces translate the interface names to physical addresses.

Figure 5:
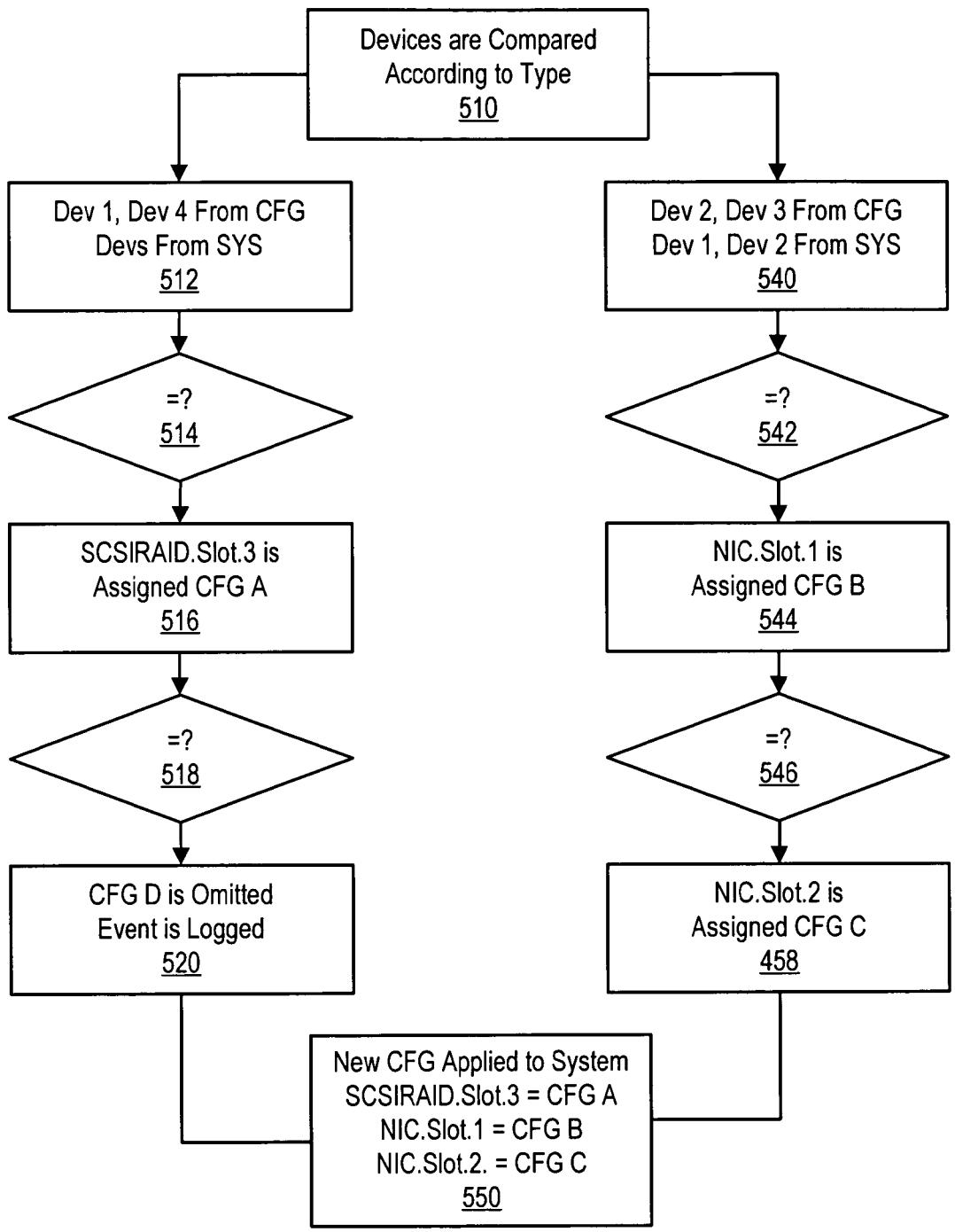
FIG. 5 shows a flow chart of an example of a best fit analysis.

Referring to FIG. 5, a flow chart of the operation of a best fit analysis is set forth. In this example, a configuration of:

| | |
|---|---|
| Dev1: scsiraid.slot.1 | has CfgA |
| Dev2: nic.emb.1 has | CfgB |
| Dev3: nic.slot.2 has | CfgC |
| Dev4: scsiraid.emb.2 | has CfgD | is compared against a system configuration of:
Dev1: nic.slot.1
Dev2: nic.slot.2
Dev3: scsiraid.slot.3

The best fit analysis begins operation by comparing the devices according to type at step 510. For example, scsiraid devices of the base system are compared with other scsiraid devices of the compare system and nic devices of the base system are compared with nic devices of the compare system.

For example, Dev1 and Dev4 of the base system and Dev3 from the compare system are determined to be scsiraid devices at step 512. The best fit analysis then determines whether the first device of the base system is equivalent to the first device of the compare system at step 514. The best fit analysis determines that the first devices are in different locations but are functionally equivalent. Accordingly, the best fit analysis assigns Dev3 of the compare system (i.e., scsiraid.slot.3) to CfgA at step 516. The best fit analysis then determines whether the second device of the base system is equivalent to a second device of the compare system at step 518. The best fit analysis determines that there is no second device present in the compare system. Accordingly, CFG D is omitted from the compare system configuration and the event is logged within the best fit analysis at step 520.

Also for example, Dev2 and Dev3 of the base system and Dev1 and Dev2 from the compare system are determined to be nic devices at step 540. The best fit analysis then determines whether the first device of the base system is equivalent to the first device of the compare system at step 542. The best fit analysis determines that the first devices are in different locations by are functionally equivalent. Accordingly, the best fit analysis assigns Dev3 of the compare system (i.e., nic.slot.1) to CfgB at step 544. The best fit analysis then determines whether the second device of the base system is equivalent to a second device of the compare system at step 546. The best fit analysis determines that the second devices are in the same location and are functionally equivalent. Accordingly, the best fit analysis assigns Dev2 of the compare system (i.e., nic.slot.2) to CfgC at step 548.

Figure 6:
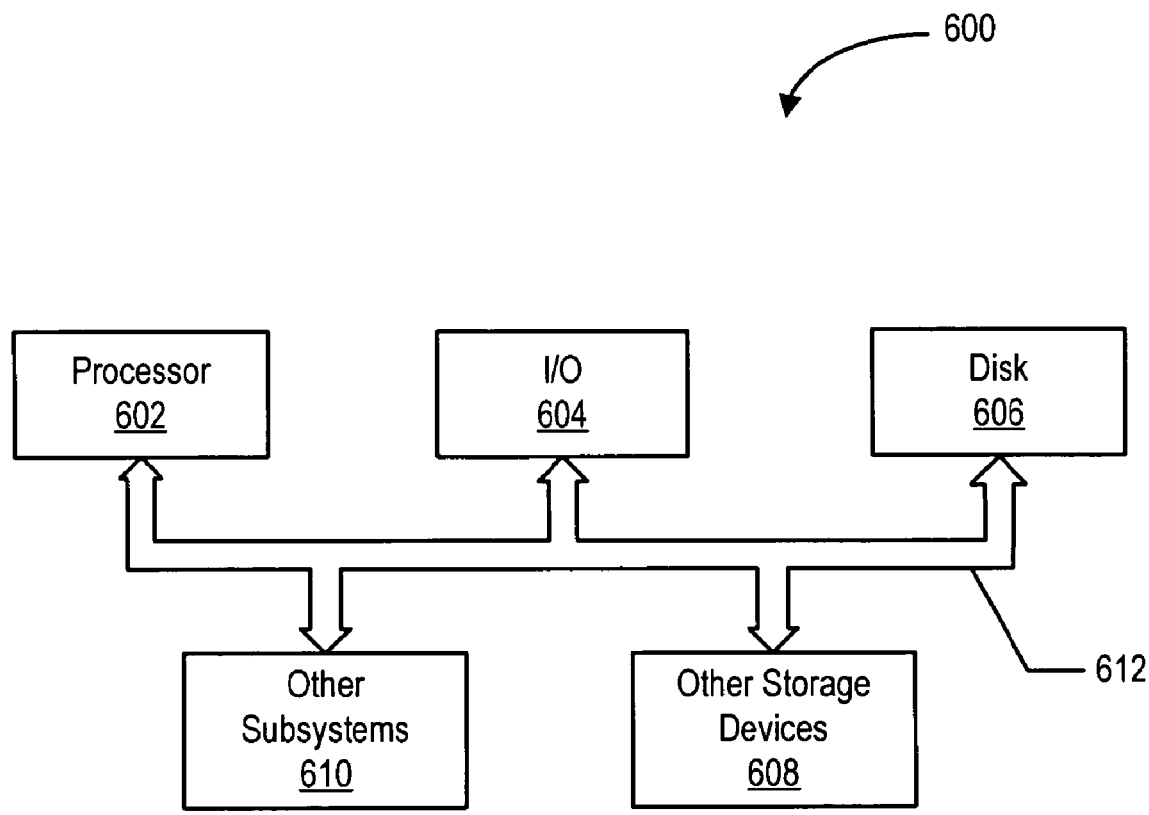
FIG. 6 shows a block diagram of an information handling system.

The new configuration is applied to the compare system at step 550 such that
scsiraid.slot.3=CfgA
nic.slot.1=CfgB
nic.slot.2=CfgC Referring to FIG. 6, a system block diagram of an information handling system 600 is shown having components configured in accordance with the method for heterogeneous system configuration. The information handling system 600 includes a processor 602, input/output (I/O) devices 604, such as a display, a keyboard, a mouse, and associated controllers, memory 605 including volatile memory such as random access memory (RAM) and non-volatile memory such as a hard disk and drive, and other storage devices 608, such as a floppy disk drive, a CD ROM drive and other memory devices, and various other subsystems 610, all interconnected via one or more buses 612.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while an example of a best fit analysis is set forth, it will be appreciated that other best fit analyses are also within the scope of the present invention.

Also for example, it will be appreciated that other physical system configurations and corresponding logical names are also within the scope of the present invention.

Also for example, while the term provision is used throughout the specification, it will be appreciated that the terms deploy and configure are functionally equivalent and are within the scope of the claims.

Also for example, the above-discussed embodiments include modules that perform certain tasks. The modules discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for configuring a plurality of systems within a solution comprising:

mapping physical identifiers of components within a compare system to respective logical identifiers of the components within the compare system, the mapping conforming to a predetermined user identifiable naming convention, the mapping providing a compare system configuration;

comparing the logical identifiers of a base system configuration with logical identifiers of the compare system configuration, the compare determining whether logical identifiers of the compare system configuration match the logical identifiers of the base system configuration;

translating the logical identifiers of the compare system to interface identifiers when the logical identifiers of the compare system configuration match the logical identifiers of the base system configuration;

determining how to map the logical identifiers of the compare system to the logical identifiers of the base system when the logical identifiers of the compare system configuration do not match the logical identifiers of the base system configuration;

translating the logical identifiers of the compare system to interface identifiers based upon the determining when the logical identifiers of the compare system configuration do not match the logical identifiers of the base system configuration;

mapping physical identifiers of components within a base system to respective logical identifiers of the components within the base system to generate the base system configuration, the mapping conforming to the predetermined user identifiable naming convention; and, using the base system configuration to map multiple systems.

2. The method of claim 1 wherein:

the predetermined user identifiable naming convention enables comparing of components having different physical locations but similar capabilities.

3. The method of claim 1 wherein:

the predetermined user identifiable naming convention enables a determination of whether components located in different physical locations are equivalent devices.

4. The method of claim 1 wherein:

the predetermined user identifiable naming convention enables a user to identify a physical location of the component within the system from a logical identifier of the component within the system.

5. The method of claim 1 further comprising:

using the predetermined user identifiable naming convention to predictably map logical identifiers for a plurality of compare systems.

\* \* \* \* \*